(12) United States Patent
Wang

(10) Patent No.: US 9,794,440 B2
(45) Date of Patent: Oct. 17, 2017

(54) IMAGE FORMING APPARATUS THAT OPERATES IN NORMAL MODE AND POWER SAVING MODE, CONTROL METHOD THEREFOR, AND STORAGE MEDIUM

(71) Applicant: CANON KABUSHIKI KAISHA, Tokyo (JP)

(72) Inventor: Xiaoli Wang, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/139,474

(22) Filed: Apr. 27, 2016

(65) Prior Publication Data

US 2016/0323469 A1    Nov. 3, 2016

(30) Foreign Application Priority Data

Apr. 28, 2015 (JP) ................................. 2015-091546

(51) Int. Cl.
G06K 15/00 (2006.01)
G06F 3/12 (2006.01)
H04N 1/00 (2006.01)

(52) U.S. Cl.
CPC ..... *H04N 1/00891* (2013.01); *H04N 1/00204* (2013.01); *H04N 1/00904* (2013.01); *H04N 1/00938* (2013.01); *H04N 2201/0094* (2013.01)

(58) Field of Classification Search
None
See application file for complete search history.

(56) References Cited

U.S. PATENT DOCUMENTS

| 8,806,241 | B2 * | 8/2014 | Shimizu | G03G 15/5004 713/320 |
| 8,918,629 | B2 * | 12/2014 | Cho | G06F 9/4418 713/1 |
| 9,015,506 | B2 * | 4/2015 | Park | H04N 1/00885 713/320 |
| 2010/0083019 | A1 * | 4/2010 | Aoki | G06F 1/3203 713/320 |

(Continued)

FOREIGN PATENT DOCUMENTS

JP        2009223866 A        10/2009

*Primary Examiner* — Miya J Williams
(74) *Attorney, Agent, or Firm* — Rossi, Kimms & McDowell LLP

(57) ABSTRACT

An image forming apparatus which is capable of quickly switching the power mode of the image forming apparatus from the power saving mode to the normal mode. The image forming apparatus includes a printer engine and operates in a normal mode and a power saving mode, the image forming apparatus further includes a main system, a sub system communicably connected with the main system, and an engine controller communicably connected with the sub system and configured to control the printer engine. When the image forming apparatus returns from the power saving mode to the normal mode, the sub system completes start-up of software necessary for communication between the sub system and the engine controller before starting software necessary for communication between the main system and the sub system is completed, and transmits, to the engine controller, device information of the image forming apparatus acquired from the main system.

17 Claims, 8 Drawing Sheets

(56) References Cited

U.S. PATENT DOCUMENTS

| | | | |
|---|---|---|---|
| 2010/0211743 A1* | 8/2010 | Hara | G06F 12/0866 |
| | | | 711/119 |
| 2012/0159212 A1* | 6/2012 | Takatani | G03G 15/5079 |
| | | | 713/320 |
| 2013/0198550 A1* | 8/2013 | Yoshida | G06F 1/3287 |
| | | | 713/324 |
| 2013/0258376 A1* | 10/2013 | Tsuchiya | G03G 15/5025 |
| | | | 358/1.13 |
| 2014/0101433 A1* | 4/2014 | Tanaka | G06F 1/3284 |
| | | | 713/100 |
| 2014/0111822 A1* | 4/2014 | Higashi | H04N 1/00904 |
| | | | 358/1.13 |
| 2015/0062607 A1* | 3/2015 | Higashi | G06F 1/32 |
| | | | 358/1.13 |

* cited by examiner

IMAGE FORMING APPARATUS THAT OPERATES IN NORMAL MODE AND POWER SAVING MODE, CONTROL METHOD THEREFOR, AND STORAGE MEDIUM

BACKGROUND OF THE INVENTION

Field of the Invention

The present invention relates to an image forming apparatus that operates in a normal mode and a power saving mode, a control method therefor, and a storage medium.

Description of the Related Art

There is conventionally known an image forming apparatus which operates, to reduce power consumption, in a plurality of power modes, for example, a normal mode of supplying power to all components and a power saving mode of inhibiting power from being supplied to at least a part or all of the components (Japanese Patent Publication (Kokai) No. 2009-223866, for example). The image forming apparatus switches the power mode to the power saving mode if no operation is performed in a certain period of time in the normal mode and switches the power mode to the normal mode if some operation is performed in the power saving mode. The image forming apparatus includes a main central processing unit (CPU), a sub CPU, an engine controller, and an operation display unit.

When the image forming apparatus including components such as the main CPU, the sub CPU, the engine controller, and the operation display unit switches the power mode from the power saving mode to the normal mode, the image forming apparatus performs return processing (FIGS. 7 and 8) of supplying power to each component. The processing of FIG. 7 is performed by the main CPU, the sub CPU, and the engine controller, and the processing of FIG. 8 is performed by the sub CPU.

In FIGS. 7 and 8, first, the main CPU performs start-up processing (steps S701-S703). Specifically, when power is supplied to the main CPU (step S701), the main CPU to which the power is supplied transmits binary data of the sub CPU to the sub CPU and releases a reset state of the sub CPU (step S702), which allows the sub CPU to start start-up processing based on the binary data. Then, the main CPU performs communication preparation processing to communicate with the sub CPU (step S703).

When the reset state of the sub CPU is released, the sub CPU performs start-up processing (steps S711-S713 and S801-803). Specifically, the sub CPU starts a kernel which is a core of an operating system (OS) of the sub CPU (steps S711 and S801), sequentially starts a plurality of device drivers for driving a plurality of devices to be started when the power mode of the image forming apparatus is switched from the power saving mode to the normal mode from, for example, a device driver corresponding to a device arranged around the sub CPU (steps S712 and S802), and establishes virtual communication with the main CPU and the engine controller (steps S713 and S803). Thereafter, the main CPU and the sub CPU communicate with each other by using a predetermined application, and the sub CPU receives information required to communicate with the engine controller, the information being related to devices controlled by the engine controller, for example, a printer and a scanner (hereinafter referred to as "various kinds of device information") from the main CPU (steps S704, S714, and S804).

The engine controller performs start-up processing independently of the main CPU and the sub CPU (step S721). The start-up processing of the engine controller is completed in a short period of time, so that the engine controller waits until the communication of the main CPU and the sub CPU is completed after the start-up processing is completed (step S722).

Subsequently, the sub CPU communicates with the engine controller, transfers various kinds of device information to the engine controller, acquires status information of the engine controller, and determines whether or not a job can be performed (steps S715, S723, and S805). The main CPU waits until the communication of the sub CPU and the engine controller is completed after the communication with the sub CPU is completed (step S705). When the sub CPU determines that a job can be performed, the sub CPU notifies the main CPU that a job can be performed; the main CPU performs control so that power is supplied to the operation display unit; and the main CPU, the sub CPU, and the engine controller wait until a job is inputted (steps S706, S716, S724, and S806), followed by terminating the program.

However, as described above, the engine controller communicates with the sub CPU after the communication of the main CPU and the sub CPU is completed, so that the engine controller has to wait until the engine controller communicates with the sub CPU after having completed the start-up processing, thereby preventing the power mode of the image forming apparatus from being switched in a short period of time, which provides a problem that it is difficult to quickly switch the power mode of the image forming apparatus from the power saving mode to the normal mode.

SUMMARY OF THE INVENTION

The present invention provides an image forming apparatus, a control method for the apparatus, and a program, which are capable of quickly switching the power mode of the image forming apparatus from the power saving mode to the normal mode.

In an aspect of the present invention, there is provided an image forming apparatus that includes a printer engine and operates in a normal mode and a power saving mode, the image forming apparatus comprising: a main system; a sub system communicably connected with the main system; and an engine controller communicably connected with the sub system and configured to control the printer engine, wherein when the image forming apparatus returns from the power saving mode to the normal mode, the sub system completes start-up of software necessary for communication between the sub system and the engine controller before starting software necessary for communication between the main system and the sub system is completed, and transmits, to the engine controller, device information of the image forming apparatus acquired from the main system.

According to the present invention, it is possible to quickly switch the power mode of the image forming apparatus from the power saving mode to the normal mode.

Further features of the present invention will become apparent from the following description of exemplary embodiments with reference to the attached drawings.

BRIEF DESCRIPTION OF THE DRAWINGS

FIGS. 5A and 5B are flowcharts each showing a procedure of the second return processing of FIG. 4, in which FIG. 5A shows a case in which the return processing in FIG. 4 is performed by a main CPU in FIG. 2, and FIG. 5B shows a case in which the return processing of FIG. 4 is performed by a sub CPU in FIG. 2.

DESCRIPTION OF THE EMBODIMENTS

The present invention will now be described in detail below with reference to the accompanying drawings showing embodiments thereof.

Figure 1:
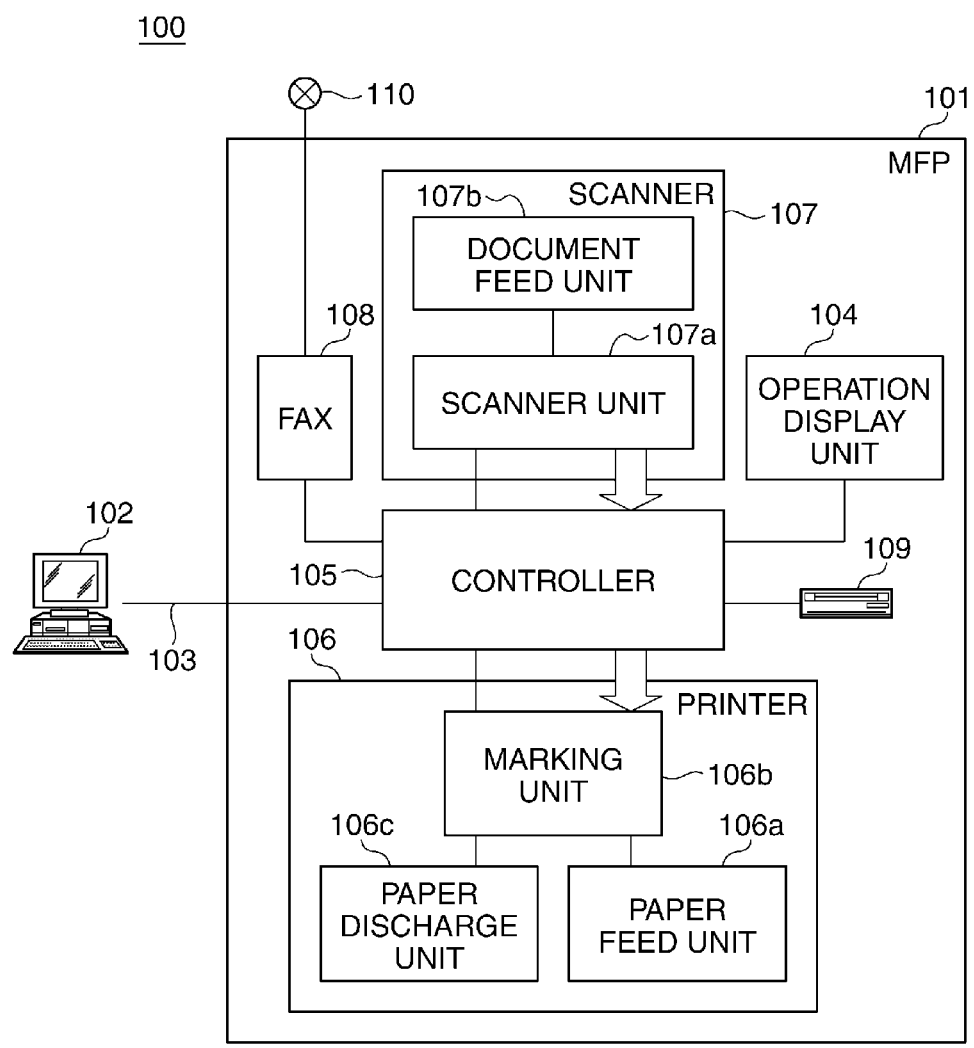
FIG. 1 is a block diagram schematically showing a configuration of an image forming system including a multi-function printer (MFP) as an image forming apparatus according to an embodiment of the present invention.

FIG. 1 is a block diagram schematically showing a configuration of an image forming system 100 including an MFP 101 as an image forming apparatus according to an embodiment of the present invention.

The image forming system 100 of FIG. 1 includes an MFP 101 and a personal computer (PC) 102 as an information processing apparatus. The MFP 101 and the PC 102 are connected to each other through a network such as a local area network (LAN) 103. The MFP 101 further includes an operation display unit 104, a controller 105, a printer 106 (a printer engine), a scanner 107, a facsimile (FAX) 108, and a hard disk drive (HDD) 109. The operation display unit 104, the printer 106, the scanner 107, the FAX 108, and the HDD 109 are connected to one another through the controller 105. The printer 106 includes a paper feed unit 106a, a marking unit 106b, and a paper discharge unit 106c. The paper feed unit 106a and the paper discharge unit 106c are connected to each other through the marking unit 106b. Further, the scanner 107 includes a scanner unit 107a and a document feed unit 107b. The scanner unit 107a and the document feed unit 107b are connected to each other.

The operation display unit 104 includes a hard key and an operation panel. A user inputs an instruction into the MFP 101 by operating the hard key and the operation panel. For example, the controller 105 receives a job from the PC 102 and controls each component of the MFP 101 by performing the received job. The printer 106 prints image data stored in the HDD 109 on a recording medium such as a recording paper. Specifically, the marking unit 106b prints the image data on the recording paper fed from the paper feed unit 106a and discharges the recording paper, on which the image data is printed, to the paper discharge unit 106c.

The scanner 107 reads a document, generates image data corresponding to the read document, and stores the generated image data into the HDD 109. Specifically, the scanner unit 107a reads a document fed from the document feed unit 107b and generates image data corresponding to the read document. The FAX 108 receives FAX data from an external apparatus connected through a telephone line 110 or transmits FAX data to an external apparatus connected through the telephone line 110. The HDD 109 is a non-volatile storage apparatus and stores various kinds of programs, various kinds of data, and the like.

Figure 2:
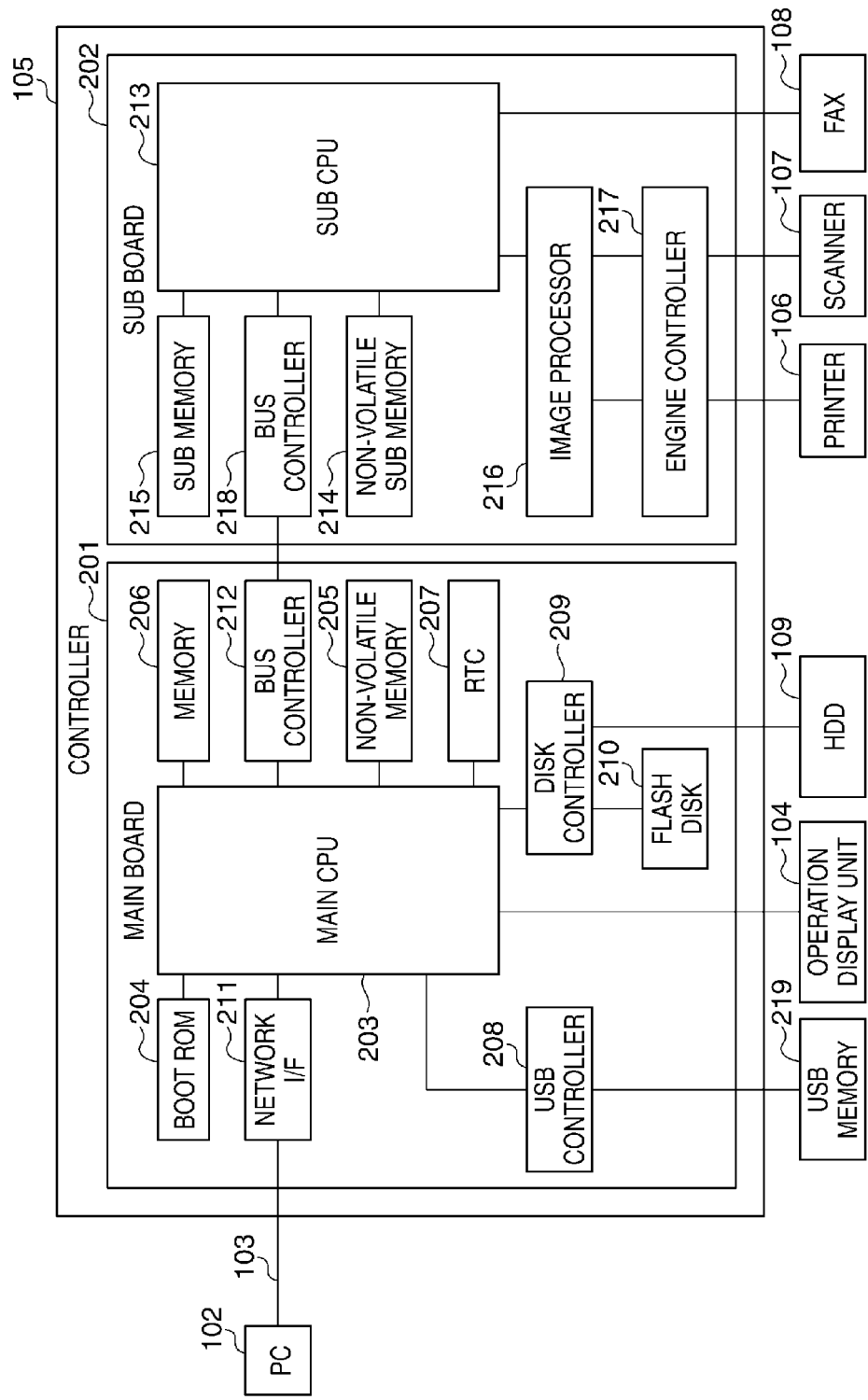
FIG. 2 is a block diagram schematically showing an internal configuration of a controller in FIG. 1.

FIG. 2 is a block diagram schematically showing an internal configuration of the controller 105 in FIG. 1.

The controller 105 in FIG. 2 includes a main board 201 (a main system) and a sub board 202 (a sub system). The main board 201 includes a main CPU 203, a boot read only memory (ROM) 204, a non-volatile memory 205, a memory 206, a real-time clock (RTC) 207, a universal serial bus (USB) controller 208, a disk controller 209, a flash disk 210, a network interface (I/F) 211, and a bus controller 212. The boot ROM 204, the non-volatile memory 205, the memory 206, the RTC 207, the USB controller 208, the disk controller 209, the network I/F 211, and the bus controller 212 are connected to one another through the main CPU 203. The flash disk 210 is connected to the main CPU 203 through the disk controller 209. The PC 102 is connected to the network I/F 211 through the LAN 103. A USB memory 219 functioning as an external apparatus is connected to the USB controller 208. The operation display unit 104 is connected to the main CPU 203. The HDD 109 is connected to the disk controller 209.

The sub board 202 includes a sub CPU 213, a non-volatile sub memory 214, a sub memory 215, an image processor 216, an engine controller 217, and a bus controller 218. The non-volatile sub memory 214, the sub memory 215, the image processor 216, and the bus controller 218 are connected to one another through the sub CPU 213. The engine controller 217 is connected to the image processor 216, the printer 106 and the scanner 107 are connected to the engine controller 217, and the FAX 108 is connected to the sub CPU 213. The bus controllers 212 and 218 are also connected to each other so that the main board 201 and the sub board 202 communicate with each other.

The main CPU 203 executes a boot program stored in the boot ROM 204 and controls each component of the main board 201. The non-volatile memory 205 stores various kinds of data, and the like, which are not erased even when a power source of the MFP 101 is turned off. The memory 206 is a work memory of the main CPU 203. The RTC 207 measures date and time even when no power is supplied to the controller 105. The USB controller 208 controls the USB memory 219 connected thereto. The disk controller 209 controls the flash disk 210, such as a solid state drive (SSD), which is connected to the disk controller 209.

The sub CPU 213 controls each component of the sub board 202. The non-volatile sub memory 214 stores various kinds of data, and the like, which are not erased even when the power source of the MFP 101 is turned off. The sub memory 215 is a work memory of the sub CPU 213. The image processor 216 converts image data described in, e.g., an image description language into bit map image data. The engine controller 217 controls the printer 106 and the scanner 107.

Figure 3:
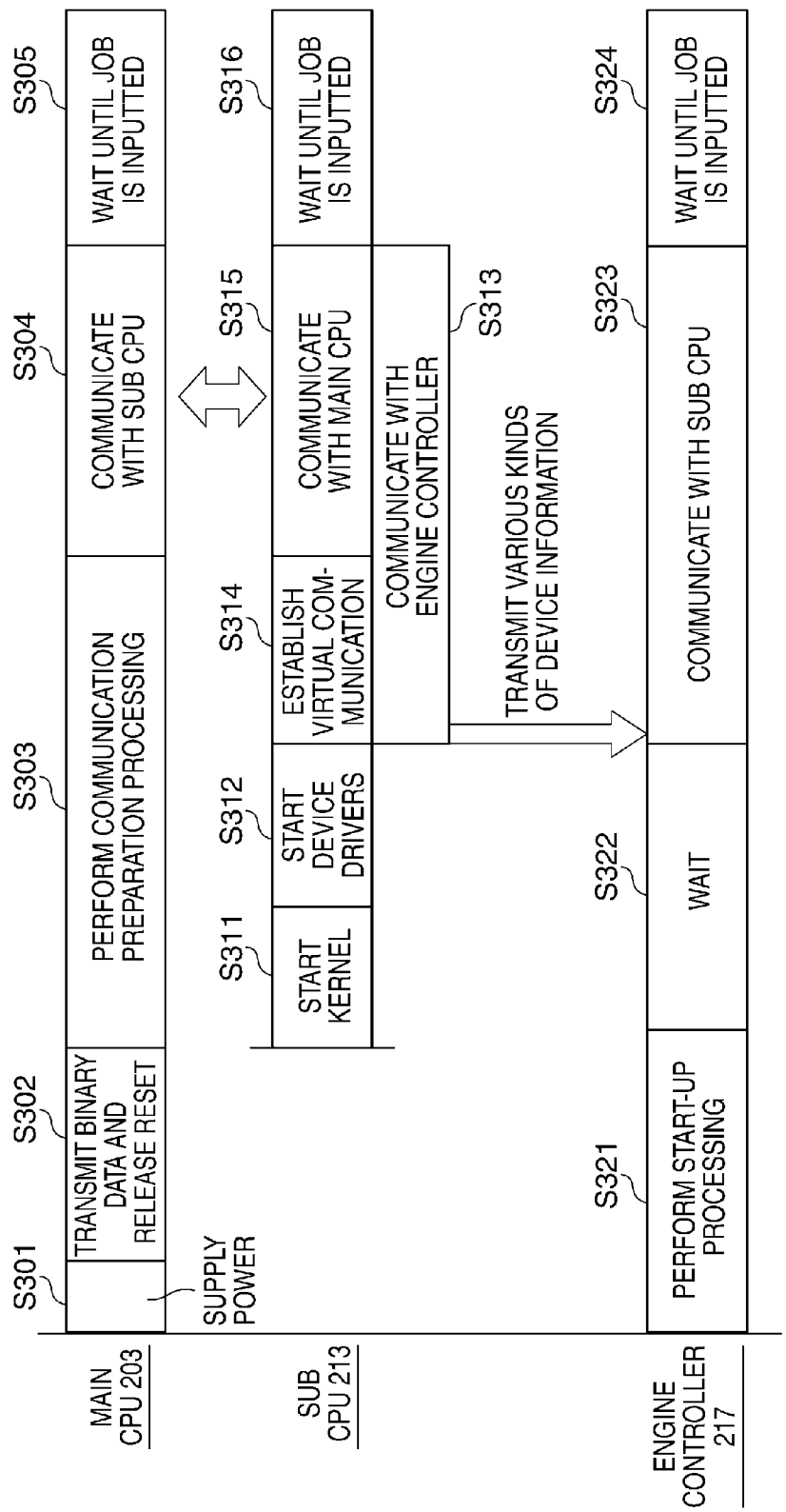
FIG. 3 is a sequence diagram showing a first return processing of returning a power mode of the MFP in FIG. 1 from a power saving mode to a normal mode.

FIG. 3 is a sequence diagram showing a first return processing of returning the power mode of the MFP 101 in FIG. 1 from the power saving mode to the normal mode. The processing of FIG. 3 is performed by the main CPU 203, the sub CPU 213, and the engine controller 217.

In FIG. 3, first, the main CPU 203 performs start-up processing (steps S301 to S303) that requires a certain period of time. Specifically, when power is supplied to the main CPU (step S301), the main CPU to which the power is supplied transmits binary data of the sub CPU 213 (a start-up program of the sub CPU 213) to the sub CPU 213 and releases a reset state of the sub CPU 213, thereby allowing the sub CPU 213 to start the start-up processing based on the binary data (step S302). The binary data is transferred from the non-volatile memory 205 or the flash disk 210 of the main board 201 to the sub memory 215 of the sub board 202. The binary data has various kinds of device information added thereto. Thereafter, the main CPU 203 performs communication preparation processing to communicate with the sub CPU 213 (step S303).

The engine controller 217 performs the start-up processing of its own at the same time when the main CPU 203 performs the start-up processing of its own (step S321). The engine controller 117 completes the start-up processing in a short period of time, and waits until the communication with the sub CPU 213 described below in steps S313 and S323 is performed after having completed the start-up processing (step S322).

The sub CPU 213 performs the start-up processing based on an instruction of the main CPU 203 (steps S311-S313). Specifically, the sub CPU 213 starts a kernel which is a core of an OS of the sub CPU 213 (step S311) and starts a plurality of device drivers (software) for driving a plurality of devices such as the printer 106 and the scanner 107 that are started when the power mode of the MFP 101 is switched from the power saving mode to the normal mode (step S312).

After all the device drivers are started, the sub CPU 213 communicates with the engine controller 217, transmits, to the engine controller 217, various kinds of device information added to the binary data, which is DMA (direct memory access)-transferred from the main CPU 203, acquires status information of the engine controller 217 (steps S313 and S323) and determines whether or not a job can be performed. The sub CPU 213 establishes virtual communication with the main CPU 203 and the engine controller 217 at the same time when communicating with the engine controller 217 (steps S314). After the virtual communication with the main CPU 203 and the engine controller 217 has established, the sub CPU 213 communicates with the main CPU 203 (steps S304 and S315).

As a result of the determination of the steps S313 and S323, when a job can be performed, the sub CPU 213 notifies the main CPU 203 that a job can be performed; the main CPU 203 controls supply of power to the operation display unit 104; and the main CPU 203, the sub CPU 213, and the engine controller 217 wait until a job is inputted (steps S305, S316, and S324), followed by terminating the program.

According to the processing of FIG. 3, when the sub CPU 213 starts, the various kinds of device information, required by the engine controller 217, is added to the binary data which is DMA-transferred from the main CPU 203 to the sub CPU 213 (step S302); accordingly, after all the device drivers having started, establishment of the communication to the sub CPU 213 and the engine controller 217 makes it possible to immediately transfer the various kinds of device information to the engine controller 217, thereby enabling engine controller 217 to quickly receive the various kinds of device information, which makes it possible to quickly switch the power mode from the power saving mode to the normal mode.

Figure 4:
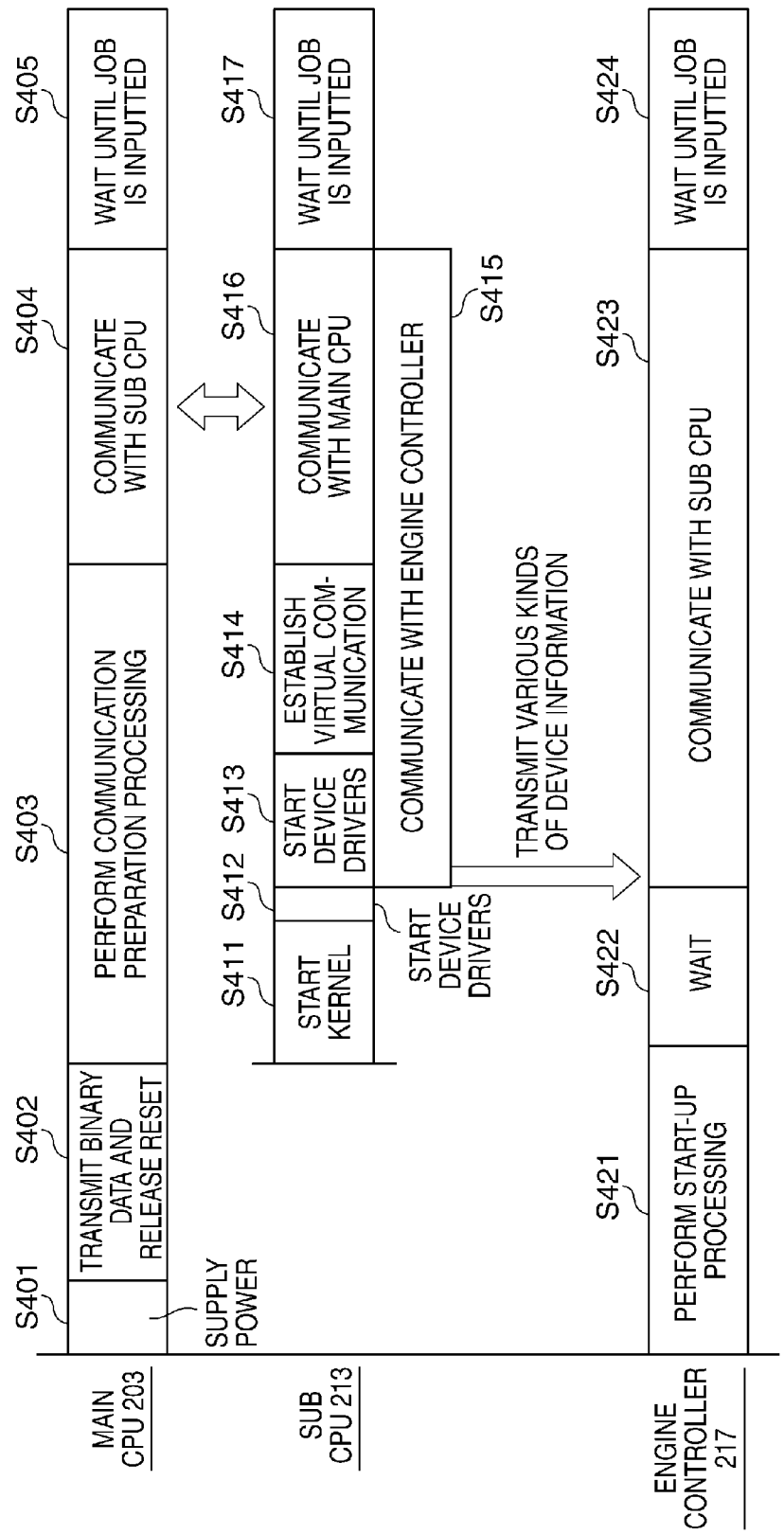
FIG. 4 is a sequence diagram showing a second return processing of returning the power mode of the MFP in FIG. 1 from the power saving mode to the normal mode.
Figure 5A:
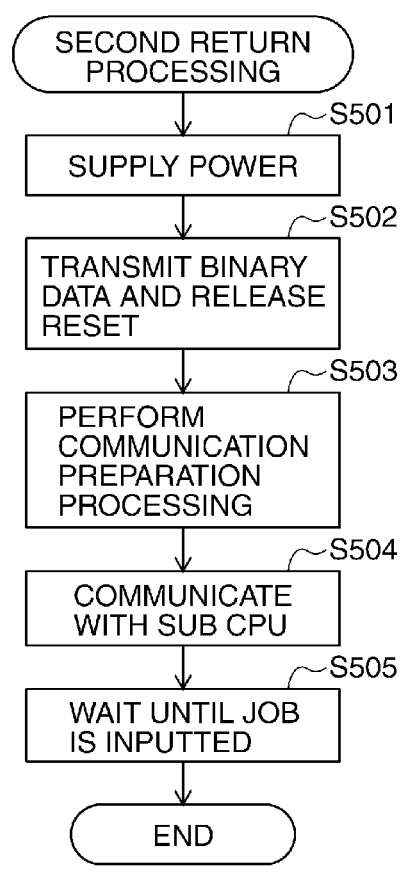
Figure 5B:
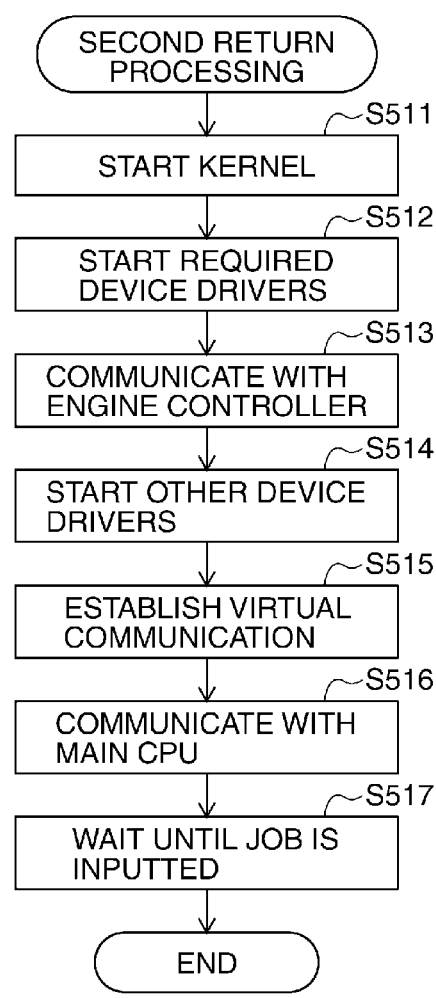

FIG. 4 is a sequence diagram showing a second return processing of returning the power mode of the MFP 101 in FIG. 1 from the power saving mode to the normal mode. The processing of FIG. 4 is performed by the main CPU 203, the sub CPU 213, and the engine controller 217. FIGS. 5A and 5B are flowcharts each showing a procedure of the second return processing of FIG. 4, in which FIG. 5A shows a case in which the return processing of FIG. 4 is performed by the main CPU in FIG. 2, and FIG. 5B shows a case in which the return processing of FIG. 4 is performed by the sub CPU in FIG. 2.

In FIGS. 4, 5A, and 5B, first, the main CPU 203 performs start-up processing (steps S401 to S403 and S501 to S503) that requires a certain period of time. Specifically, when power is supplied to the main CPU 203 (steps S401 and S501), the main CPU 203 to which the power is supplied transmits binary data of the sub CPU 213 (a start-up program of the sub CPU 213) to the sub CPU 213 and releases a reset state of the sub CPU 213, which allows the sub CPU 213 to start the start-up processing based on the binary data (steps S402 and S502). Also in the second return processing, the various kinds of device information is added to the binary data to be DMA-transferred to the sub CPU 213. Thereafter, the main CPU 203 performs communication preparation processing to communicate with the sub CPU 213 (steps S403 and S503).

The engine controller 217 performs the start-up processing of its own at the same time when the main CPU 203 performs the start-up processing of its own (step S421). The engine controller 217 completes the start-up processing in a short period of time, and waits until the communication with the sub CPU 213 described below in steps S415 and S423 is performed after having completed the start-up processing (step S422).

The sub CPU 213 performs the start-up processing (steps S411-S414, S511-S512, and S514-515) based on an instruction of the main CPU 203. Specifically, the sub CPU 213 starts a kernel which is a core of an OS of the sub CPU 213 (steps S411 and S511) and preferentially starts device drivers necessary to communicate with the sub CPU 213 and the engine controller 217 (hereinafter referred to as the "indispensable device drivers") (steps S412 and S512) from among a plurality of device drivers for driving a plurality of devices such as the printer 106 and the scanner 107 that are started when the power mode of the MFP 101 is switched from the power saving mode to the normal mode.

Figure 6:
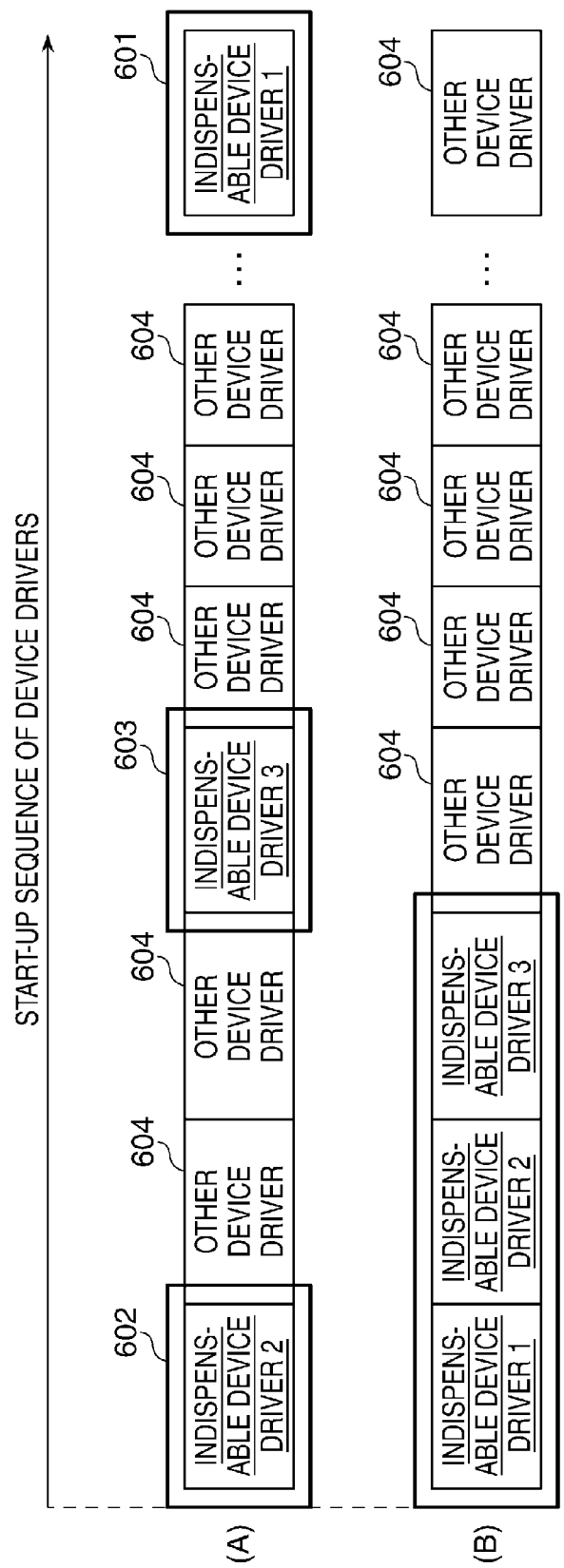
FIG. 6 is a view which is useful in explaining start-up processing of starting a plurality of device drivers in steps S412 and S413 of FIG. 4, in which (A) shows a case of conventional start-up processing, and (B) shows a case of the start-up processing in the second return processing.
Figure 7:
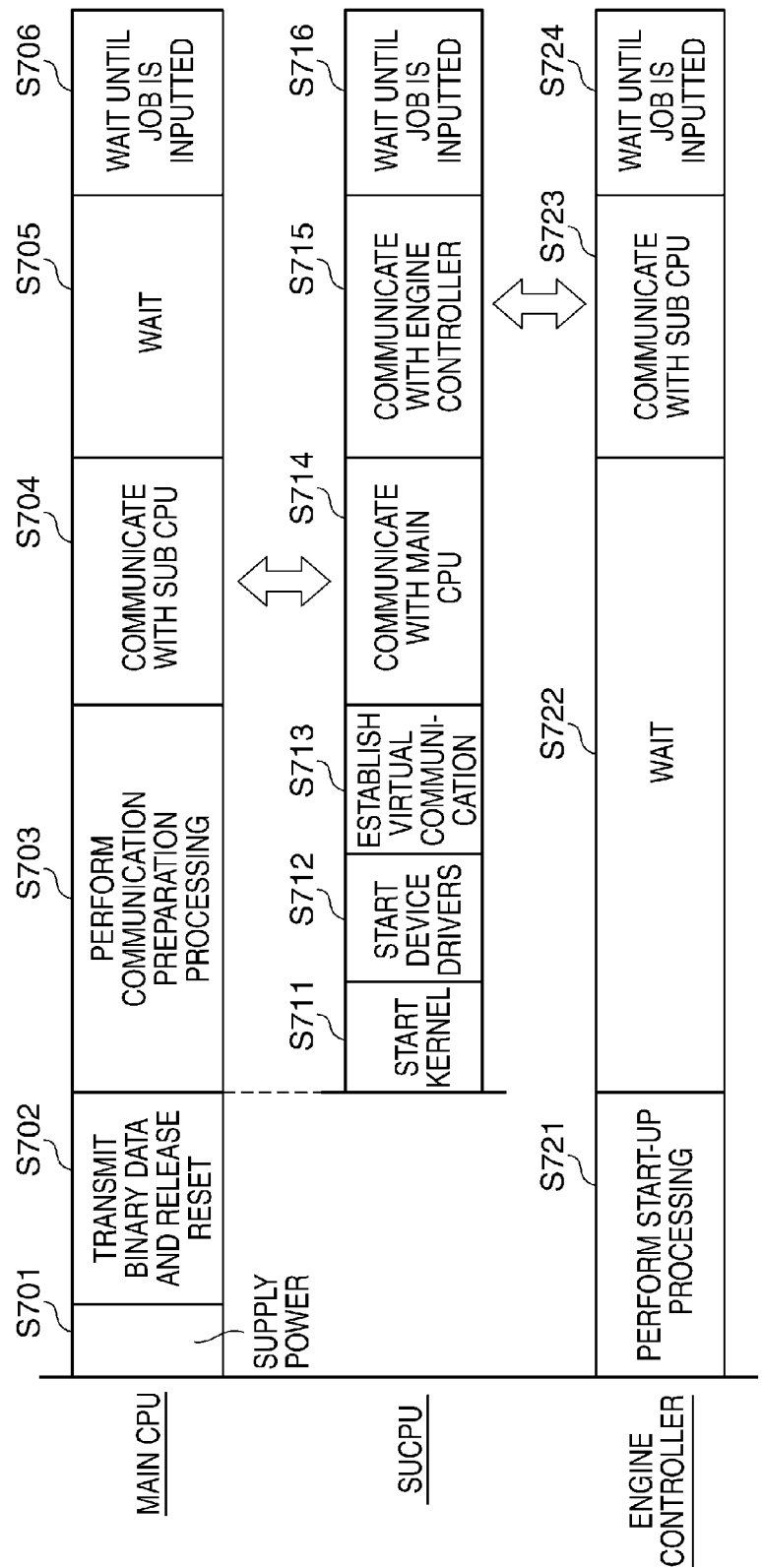
FIG. 7 is a sequence diagram showing return processing of returning a power mode of a conventional image forming apparatus from a power saving mode to a normal mode.
Figure 8:
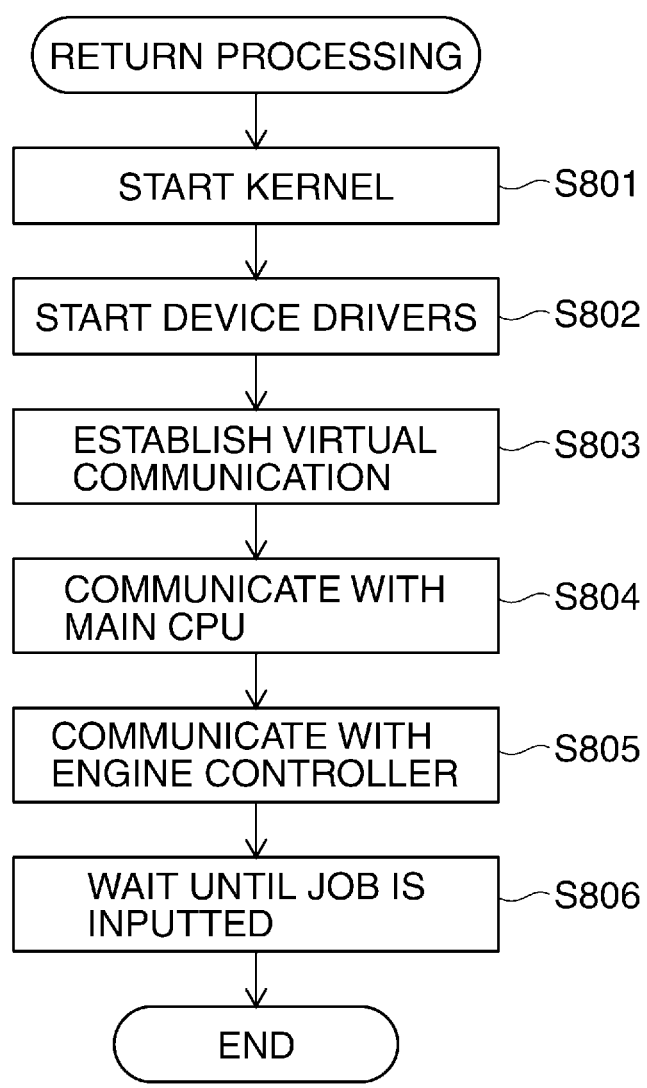
FIG. 8 is a flowchart showing the procedure of the return processing of FIG. 7 performed by the sub CPU.

Normally, as shown in FIG. 6, when the plurality of device drivers include the indispensable device drivers 601 to 603 and device drivers 604 other than the indispensable device drivers 601 to 603 (hereinafter referred to as the "other device drivers"), the indispensable device drivers 601 to 603 and the other device drivers 604 are randomly started. Therefore, any one of the indispensable device drivers 601 to 603 may be started last among all the device drivers (see (A) in FIG. 6). When the indispensable device drivers 601 to 603 do not start, it is difficult for the sub CPU 213 to communicate with the engine controller 217. Therefore, in the second return processing, the indispensable device drivers 601 to 603 are started in preference to the other device drivers 604 (see (B) in FIG. 6) in order to early perform the communication of the sub CPU 213 and the engine controller 217. Therefore, the start-up of the indispensable device drivers 601 to 603 is completed before the other device drivers 604 are started. The other device drivers include, for example, a device driver required for the communication of the main CPU 203 and the sub CPU 213, a device driver that identifies and manages each component of the MFP 101, and a device driver that controls the image processor 216.

Returning to FIGS. 4, 5A, and 5B. When the indispensable device drivers 601 to 603 are started in preference to the other device drivers 604, the sub CPU 213 immediately communicates with the engine controller 217, transmits, to the engine controller 217, various kinds of device information added to the binary data, which is DMA-transmitted from the main CPU 203, acquires status information of the engine controller 217, and determines whether or not a job can be performed (steps S415, S423 and S513).

Next, the sub CPU 213 starts the indispensable device drivers 601 to 603 and subsequently starts the other device drivers 604 (steps S413 and S514), and establishes virtual communication of the main CPU and the engine controller after having started all the device drivers (steps S414 and S515).

Thereafter, the sub CPU 213 communicates with the main CPU 203 by using a predetermined application (steps S404, S416, S504, and S516), and as a result of the determination of the steps S415, S423, and S513, when a job can be performed, the sub CPU 213 notifies the main CPU 203 that a job can be performed. The main CPU 203 controls supply of power to the operation display unit 104, and then the main CPU 203, the sub CPU 213, and the engine controller 217 wait until a job is inputted (steps S405, S417, S424, S505, and S517), followed by terminating the program.

According to the processing of FIGS. 4, 5A, and 5B, the indispensable device drivers 601 to 603 necessary to communicate with the sub CPU 213 and the engine controller 217, from among a plurality of device drivers for driving a plurality of devices that are started when the power mode of the MFP 101 is switched from the power saving mode to the normal mode, are started in preference to the other device drivers 604 (steps S412 and S512). Accordingly, the communication of the sub CPU 213 and the engine controller 217 is performed early, which makes it possible to shorten a waiting time from when the engine controller 217 completes the start-up processing to when the engine controller 217 receives the various kinds of device information required by the engine controller 217 when switching the power mode from the power saving mode to the normal mode. This makes it possible to quickly switch the power mode from the power saving mode to the normal mode.

The present invention can also be implemented by processing where a program that realizes one or more functions of the embodiment described above is supplied to a system or an apparatus through a network or a storage medium and one or more processors in a computer of the system or the apparatus reads and executes the program. Further, the present invention can also be implemented by a circuit (for example, application specific integrated circuit (ASIC)) that realizes the one or more functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2015-091546 filed Apr. 28, 2015, which is hereby incorporated by reference herein in its entirety.

What is claimed is:

1. An image forming apparatus that includes a printer engine and operates in a normal mode and a power saving mode, the image forming apparatus comprising:
   a main system;
   a sub system communicably connected with the main system; and
   an engine controller communicably connected with the sub system and configured to control the printer engine,
   wherein when the image forming apparatus returns from the power saving mode to the normal mode, the sub system completes start-up of software necessary for communication between the sub system and the engine controller before starting software necessary for communication between the main system and the sub system is completed, and transmits, to the engine controller, device information of the image forming apparatus acquired from the main system.

2. The image forming apparatus according to claim 1, wherein when the image forming apparatus returns from the power saving mode to the normal mode, the main system transmits, to the sub system, a start-up program of the sub system together with the device information of the image information apparatus.

3. The image forming apparatus according to claim 1, wherein the device information is information based on which the engine controller controls the printer engine.

4. A control method for an image forming apparatus that includes a printer engine and operates in a normal mode and a power saving mode, the image forming apparatus comprising a main system, a sub system communicably connected with the main system, and an engine controller communicably connected with the sub system and configured to control the printer engine, the control method comprising:
   a step of, when the image forming apparatus returns from the power saving mode to the normal mode, the sub system completing start-up of software necessary for communication between the sub system and the engine controller before starting software necessary for communication between the main system and the sub system is completed, and transmitting, to the engine controller, device information of the image forming apparatus acquired from the main system.

5. The control method for the image forming apparatus according to claim 4, wherein when the image forming apparatus returns from the power saving mode to the normal mode, the main system transmits, to the sub system, a start-up program of the sub system together with the device information of the image information apparatus.

6. The control method for the image forming apparatus according to claim 4, wherein the device information is information based on which the engine controller controls the printer engine.

7. An image forming apparatus that operates in a normal mode and a power saving mode, the image forming apparatus comprising:
- a printer engine;
- a main system;
- a sub system communicably connected with the main system; and
- an engine controller communicably connected with the sub system and configured to control the printer engine,
- wherein when the image forming apparatus returns from the power saving mode to the normal mode, the sub system starts a start-up processing of software necessary for communication between the sub system and the engine controller before a start-up processing of software necessary for communication between the main system and the sub system is completed, and transmits, to the engine controller, device information of the image forming apparatus acquired from the main system.

8. The image forming apparatus according to claim 7, wherein when the image forming apparatus returns from the power saving mode to the normal mode, the main system transmits, to the sub system, a start-up program of the sub system and the device information of the image information apparatus.

9. The image forming apparatus according to claim 8, wherein the start-up program and the device information is DMA (direct memory access)-transferred from the main system.

10. The image forming apparatus according to claim 8, wherein the main system resets the sub system, after the main system transmits, to the sub system, the start-up program and the device information.

11. The image forming apparatus according to claim 7, wherein the software necessary for communication between the main system and the sub system is software necessary for communication between a CPU of the main system and a CPU of the sub system.

12. The image forming apparatus according to claim 7, wherein the software necessary for communication between the sub system and the engine controller is software necessary for communication between a CPU of the sub system and a CPU of the engine controller.

13. The image forming apparatus according to claim 7, wherein the main system is arranged in a main board and the sub system is arranged in a sub board.

14. The image forming apparatus according to claim 7, wherein the main system has a non-volatile memory which stores the device information.

15. The image forming apparatus according to claim 8, wherein the main system has a non-volatile memory which stores the start-up program of the sub system.

16. The image forming apparatus according to claim 7, wherein the device information is information based on which the engine controller controls the printer engine.

17. A control method for an image forming apparatus that operates in a normal mode and a power saving mode, and includes a printer engine, a main system, a sub system communicably connected with the main system and an engine controller communicably connected with the sub system and configured to control the printer engine, the control method comprising:
- transmitting, when the image forming apparatus returns from the power saving mode to the normal mode, a start-up program of the sub system and device information of the image information apparatus from the main system,
- starting, in the sub system, a start-up processing of software necessary for communication between the sub system and the engine controller before a start-up processing of software necessary for communication between the main system and the sub system is completed, and
- transmitting, to the engine controller from the sub system, the device information of the image forming apparatus.

* * * * *